United States Patent
Burge et al.

(10) Patent No.: US 8,345,936 B2
(45) Date of Patent: Jan. 1, 2013

(54) MULTISPECTRAL IRIS FUSION FOR ENHANCEMENT AND INTEROPERABILITY

(75) Inventors: Mark J. Burge, Merrifield, VA (US); Matthew K. Monaco, Arlington, VA (US)

(73) Assignee: Noblis, Inc., Falls Church, VA (US)

( * ) Notice: Subject to any disclaimer, the term of this patent is extended or adjusted under 35 U.S.C. 154(b) by 783 days.

(21) Appl. No.: 12/453,364

(22) Filed: May 8, 2009

(65) Prior Publication Data

US 2009/0279790 A1 Nov. 12, 2009

Related U.S. Application Data

(60) Provisional application No. 61/051,787, filed on May 9, 2008.

(51) Int. Cl.
 *G06K 9/00* (2006.01)
 *G06K 9/46* (2006.01)
 *G06K 9/62* (2006.01)

(52) U.S. Cl. ........ 382/117; 382/165; 382/168; 382/191; 382/225

(58) Field of Classification Search .................. None
 See application file for complete search history.

(56) References Cited

U.S. PATENT DOCUMENTS

| | | | |
|---|---|---|---|
| 4,641,349 A * | 2/1987 | Flom et al. ..................... | 382/117 |
| 7,027,619 B2 * | 4/2006 | Pavlidis et al. ............... | 382/115 |
| 2003/0012413 A1 * | 1/2003 | Kusakari et al. ............. | 382/117 |
| 2007/0274570 A1 * | 11/2007 | Hamza .......................... | 382/117 |
| 2008/0049185 A1 * | 2/2008 | Huffman et al. .............. | 351/206 |

OTHER PUBLICATIONS

Boyce et al., "Multispectral Iris Analysis: A Preliminary Study," *Proceedings of IEEE Computer Society Workshop on Biometrics*, Jun. 2006 (9 pages).
Burge et al., "Algorithms and Technologies for Multispectral, Hyperspectral, and Ultraspectral Imagery XV (2009)," *Proceedings of the SPIE*, vol. 7334, pp. 73341D-73341D-8, available at http://dl.getdropbox.com/u/418357/spie/burge-monaco-spie.pdf (visited Sep. 22, 2009) (8 pages).
Burger et al., "Digital Image Processing: An Algorithmic Introduction Using Java," *Springer Science Business Media, LLC*, First Edition, 2008.
Daugman, "Complete Discrete 2-D Gabor Transforms by Neural Networks for Image Analysis and Compression," *IEEE Transactions on Acoustics, Speech and Signal Processing*, vol. 36, No. 7, Jul. 1988 (11 pages).

(Continued)

*Primary Examiner* — Atiba O Fitzpatrick
*Assistant Examiner* — Jhere Rowland
(74) *Attorney, Agent, or Firm* — Finnegan, Henderson, Farabow, Garrett & Dunner, L.L.P.

(57) ABSTRACT

A multispectral iris recognition system includes a multispectral camera adapted to acquire spatially registered iris images simultaneously in at least three wavelengths and a database adapted to store the acquired iris images. A texture analysis section identifies an area within each acquired iris image having a maximum texture at each of the wavelengths. The identified areas are combined to generate an enhanced iris image. Additionally, a visible light iris image is acquired and stored along with a set of transformation mappings in a database. The acquired visible light iris image is modeled in a texture model, which clusters textures from the acquired visible light iris image. A mapping is selected from the database for each of the clusters. The selected mappings are applied to the acquired visible light iris image to generate a Near-Infrared equivalent.

13 Claims, 16 Drawing Sheets

OTHER PUBLICATIONS

Daugman, "How Iris Recognition Works," *IEEE Transactions on Circuits and Systems for Video Technology*, vol. 14, No. 1, Jan. 2004 (10 pages).

Haralick et al., "Textural Features for Image Classification," *IEEE Transactions on Systems, Man, and Cybernetics*, vol. SMC-3, No. 6, Nov. 1973 (12 pages).

Jain et al., "Introduction to Biometrics," *Biometrics: Personal Identification in Networked Society*, Kluwer Academic Publishers, Second Printing 1999 (42 pages).

Monaco, "Color Space Analysis for Iris Recognition," MSEE Dissertation, *West Virginia University*, 2007 (104 pages).

Sonka et al., "Image Processing, Analysis, and Machine Vision," *Thomson-Engineering*, Third Edition, 2007.

\* cited by examiner

US 8,345,936 B2

MULTISPECTRAL IRIS FUSION FOR ENHANCEMENT AND INTEROPERABILITY

RELATED APPLICATIONS

This application claims the benefit of the filing date of U.S. Provisional Application No. 61/051,787, filed May 9, 2008, titled "Multispectral Iris Fusion for Enhancement and Interoperability," of Mark J. Burge and Matthew K. Monaco, incorporated in its entirety herein by reference.

FIELD

The present invention relates generally to iris matching, and more particularly, to methods and systems for improving iris image capture, matching, and generation.

BACKGROUND

Iris recognition is a method of biometric authentication that uses pattern recognition techniques based on high-resolution images of the irides of a person's eyes. Iris recognition systems use camera technology to create images of the detail-rich, intricate structures of an iris. Mathematical representations of images of the iris may help generate a positive identification of an individual.

Traditionally, most commercial iris recognition systems use only a small portion of the Near-Infrared (NIR) spectrum (e.g., 700-900 nm), to alleviate physical discomfort from illumination, reduce specular reflections, and increase the amount of structure captured from some iris colors. Matching accuracy is not invariant to iris color, however, and may be improved by imaging outside of the NIR spectrum.

SUMMARY OF THE INVENTION

Consistent with an embodiment of the present invention, a multispectral iris recognition system is disclosed. The system comprises a multispectral imaging device adapted to acquire spatially registered images of an iris simultaneously in at least three wavelengths; a database adapted to store the acquired images; a texture analysis section adapted to identify an area within each acquired image having a maximum texture at each of the wavelengths; and an image generation section adapted to combine the identified areas to generate an enhanced image of the iris.

Consistent with another embodiment, a system for generating iris images is disclosed. The system comprises an iris image acquisition device adapted to acquire a visible light image of an iris; a database adapted to store the acquired visible light iris image and transformation mappings; a texture model section adapted to model the acquired visible light image in a texture model that clusters features from the acquired visible light image; a mapping section adapted to select a transformation mapping from the database for each of the clusters; an image transformation section adapted to apply the selected mappings to the acquired visible light image to generate a Near-Infrared equivalent representation of the iris; and an image output section adapted to output the Near-Infrared equivalent representation of the iris.

Consistent with yet another embodiment, a method for generating iris images is disclosed. The method comprises acquiring a visible light image of an iris; storing the acquired visible light iris image and transformation mappings in a database; modeling the acquired visible light image by clustering textures from the acquired visible light image; selecting mappings from the database for each of the clusters; applying the selected mappings to the acquired visible light image to generate a Near-Infrared equivalent representation of the iris; and matching the Near-Infrared equivalent with a Near-Infrared image of the iris.

DESCRIPTION OF THE EMBODIMENTS

Figure 1:
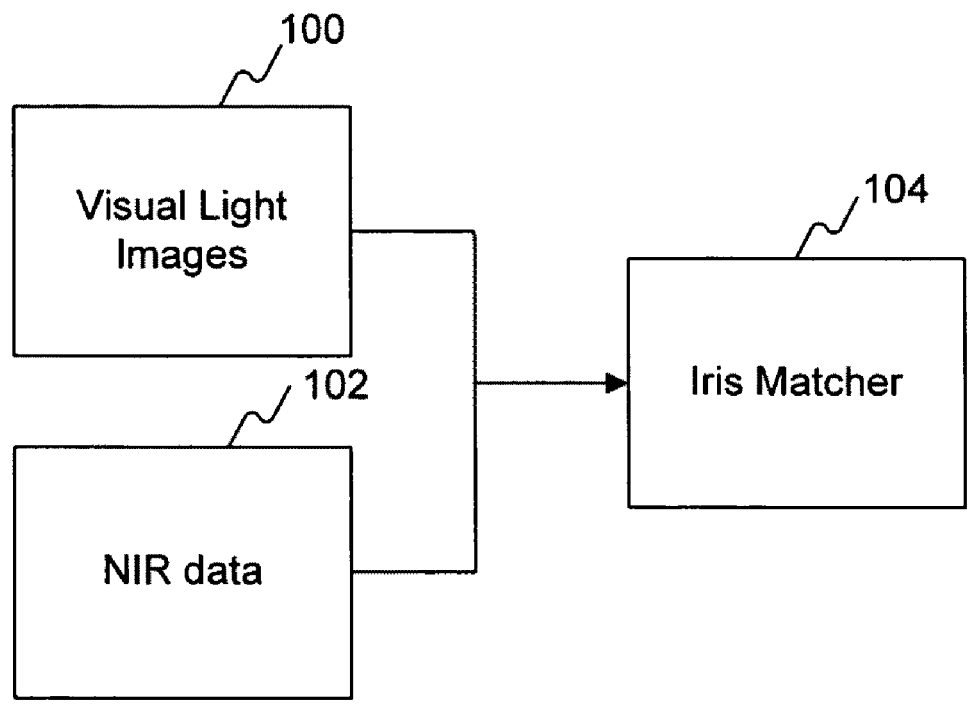
FIG. 1 shows a diagram of a system for matching visible light images and NIR data, consistent with an embodiment of the present invention.

Reference will now be made in detail to exemplary embodiments of the invention, examples of which are illustrated in the accompanying drawings. Wherever possible, the same reference numbers will be used throughout the drawings to refer to the same or like parts.

The physiological properties of irides (e.g., the amount and distribution of melanin) impact the transmission, absorbance, and reflectance of different portions of the electromagnetic spectrum. For example, irides that contain less melanin (e.g., blue, green and gray) absorb more NIR illumination than darker colored (e.g., brown, black) irides. As a result, it is sometimes difficult to directly match NIR images or the IrisCodes derived from them (especially for dark eyes) to images of irides which have been extracted from images and videos collected in the visible spectrum. As an example, there exists a need for more accurate biometric identification of individuals appearing in visible light (color) videos and images, such as those collected by journalists, surveillance cameras, or during the Iraqi national identification program.

There exists a need to increase the spectral range under which iris images are acquired, so that the rich content of the iris will become better defined and less dependent on ideal collection conditions. Single-lens and dual-lens multispectral devices are capable of simultaneous acquisition of NIR and visible light images (i.e., images in other spectral ranges), and may be used to collect a database of pixel-level registered multispectral iris images. Using this data, machine learning transformation mappings may be developed for the pixel-level transformation of visible light iris images into a format suitable for matching against existing NIR-based IrisCodes (e.g., for biometric authentication).

Additionally, there exists a need to improve the performance of commercial off-the-shelf iris matchers. As mentioned above, NIR images do not sufficiently image well-defined texture. To create optimal iris images, there exists a need to fuse additional texture from images collected over multiple wavelengths outside the NIR spectrum. These optimal iris images may exploit texture variations in iris color, which may improve the performance of commercial off-the-shelf iris matchers and may reduce failure to enroll rates.

A multispectral iris imaging system consistent with embodiments of the present invention enables the simultaneous acquisition of NIR and visible light images and the creation of a database of pixel-level registered NIR iris images and visible light iris images. Machine learning methods consistent with embodiments of the present invention generate functions to transform a visible light iris image into a format suitable for matching against IrisCodes derived from previously-captured NIR images. A system for generating optimal iris images, consistent with an embodiment of the present invention, reduces the rate of errors when irises are captured and stored (i.e., the "failure to enroll" rate), and improves the matching performance of poor quality iris images.

I. Iris Matching

It is possible to identify individuals in visible light images (e.g., those collected by journalists, surveillance cameras, etc.) by using an iris matcher to compare the visible light image(s) to known or previously-stored NIR data. For example, a company may compile NIR photos of its employees to create previously-stored NIR data. The company may then use surveillance cameras to capture visible light images of individuals at a company facility and identify them as employees or not. FIG. 1 shows a diagram of a system for matching visible light images and NIR data, consistent with an embodiment of the present invention. As shown in FIG. 1, visible light images 100, such as scanned ID cards, digital photographs, etc. may be captured. NIR data 102 may include images collected using NIR imaging devices (e.g., Handheld Interagency Identify Detection Equipment (HIIDE™)), or stored NIR IrisCodes, for example from a government database. Visible light images 100 and NIR data 102 may be input into iris matcher 104. Iris matcher 104 may be any iris matcher known in the art. In certain embodiments, the visible light images and NIR data may be captured simultaneously from a subject, as described in detail below.

Figure 2:
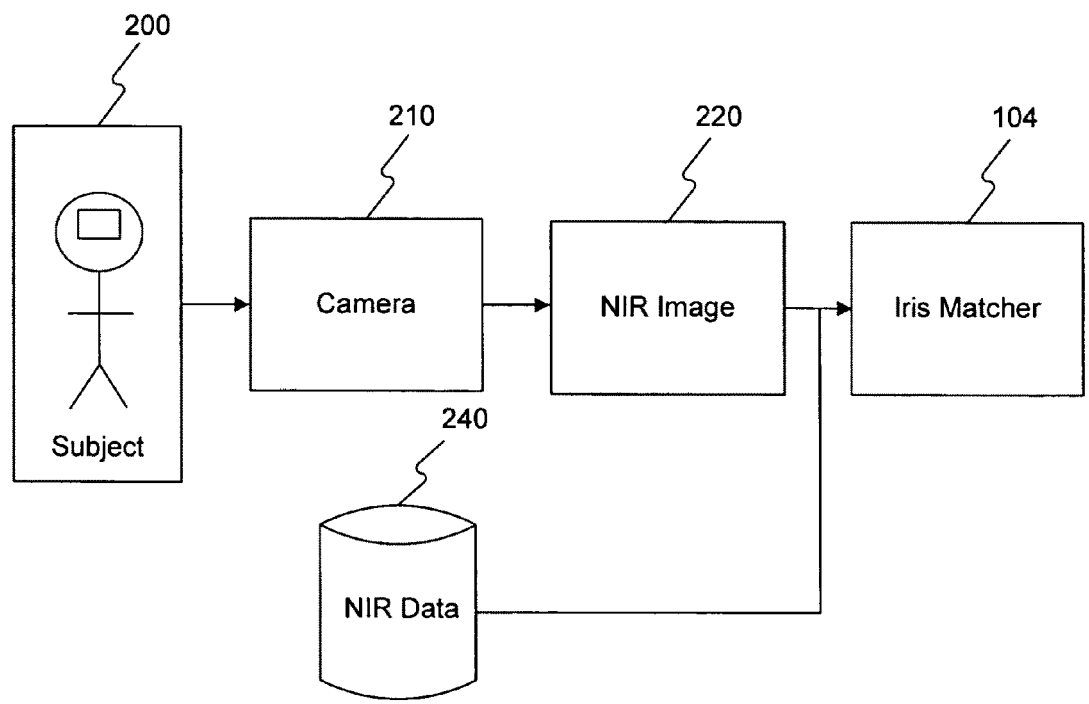
FIG. 2 shows a diagram of a system that provides NIR data to an iris matcher, consistent with an embodiment of the present invention.

FIG. 2 shows a diagram of a system that provides for the input of NIR data into an iris matcher, consistent with an embodiment of the present invention. As shown in FIG. 2, subject 200's visible light and NIR images may be captured by camera 210. Camera 210 may be a commercially available off-the-shelf (COTS) iris imaging device, for example. In certain embodiments, camera 210 may capture subject 200's irises, eyes, face, entire body, etc. Camera 210 captures NIR image 220, which may then be input into iris matcher 104. Alternatively or additionally, in certain embodiments, NIR data 240 may be input into iris matcher 104. NIR data 240 may be, for example, a database of NIR images, such as images captured by a government agency, or a company during enrollment of personnel. One skilled in the art may envision any number of scenarios for the creation of NIR data 240.

Figure 3:
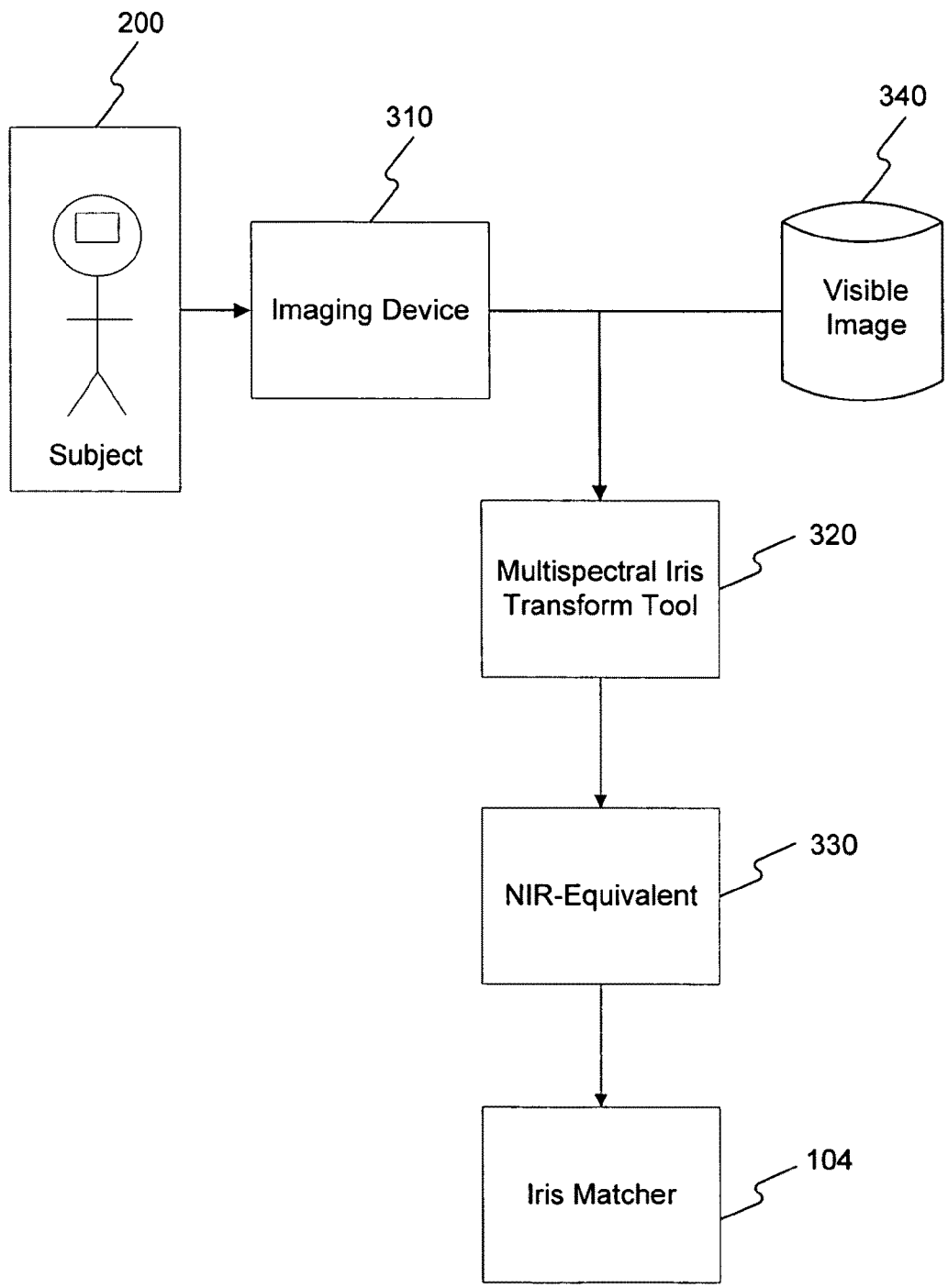
FIG. 3 shows a diagram of a system that provides visible light image data to an iris matcher, consistent with an embodiment of the present invention.

FIG. 3 shows a diagram of a system that provides visible light image data to an iris matcher, consistent with an embodiment of the present invention. As shown in FIG. 3, subject 200's visible light image may be captured by imaging device 310. Imaging device 310 may include, for example, a multispectral imaging device, described in more detail below with respect to FIG. 6, a stereo rig, which is described in more detail below with respect to FIG. 7, or a COTS iris imaging device. Once captured, the visible light image may be processed by multispectral iris transform tool 320, described in more detail below with respect to FIGS. 9-13. Multispectral iris transform tool 320 may generate an NIR-equivalent image 330 that can be used by iris matcher 104. Alternatively or additionally, images from visible image database 340, such as one or more visible light images, may be used by multispectral iris transform tool 320. Visible image database 340 may be any database of visible images, such as images captured by journalists, surveillance cameras, or identification programs such as the Iraqi National Identification Program. One skilled in the art may envision any number of scenarios for the creation of visible image database 340.

Figure 4:
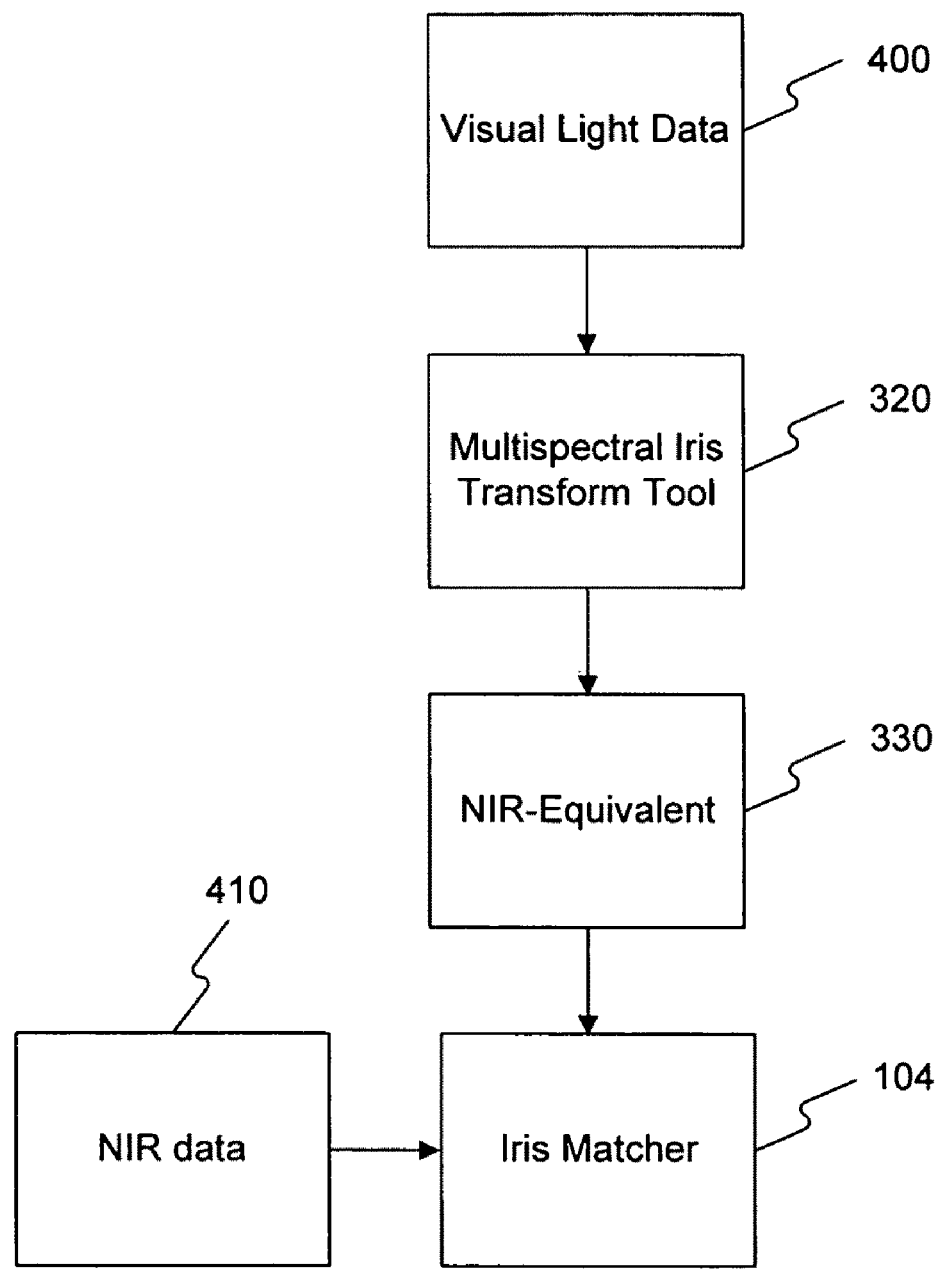
FIG. 4 shows a diagram of a system for iris matching using NIR-Equivalent data and NIR data, consistent with an embodiment of the present invention.

FIG. 4 shows a diagram of a system for iris matching using NIR-Equivalent data and NIR data, consistent with an embodiment of the present invention. As shown in FIG. 4, visible light data 400 may be processed by multispectral iris transform tool 320 to create NIR-equivalent data 330 that can be used by iris matcher 104. NIR-equivalent data may be, for example, an iris image, an iris code, or other data used by iris matchers, iris recognition systems, or biometric identification systems, etc. Iris matcher 104 may then determine whether a match exists between NIR data 410 and NIR-equivalent 330.

II. Iris Image Acquisition

Figure 5:
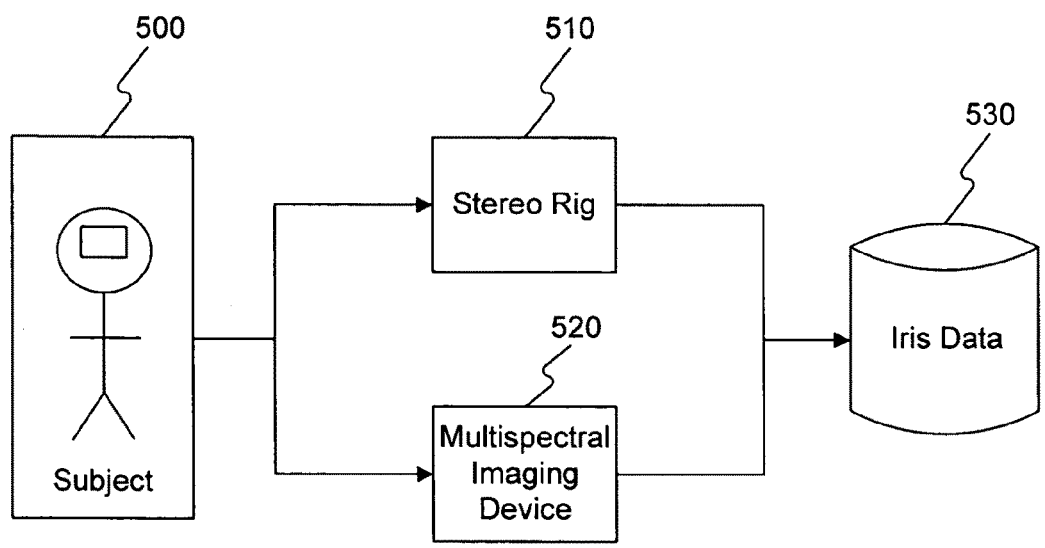
FIG. 5 shows a diagram of a system for the acquisition of iris image data, consistent with an embodiment of the present invention.

FIG. 5 shows a diagram of a system for the acquisition of iris image data, consistent with an embodiment of the present invention. As shown in FIG. 5, subject 500's visible light image or NIR image may be captured by stereo rig 510 (described in more detail below with respect to FIG. 7) and/or by multispectral imaging device 520 (described in more detail below with respect to FIG. 6). The image(s) may be processed and stored in iris data database 530. Database 530 may be any image storage solution capable of storing visible light images and NIR images.

Figure 6:
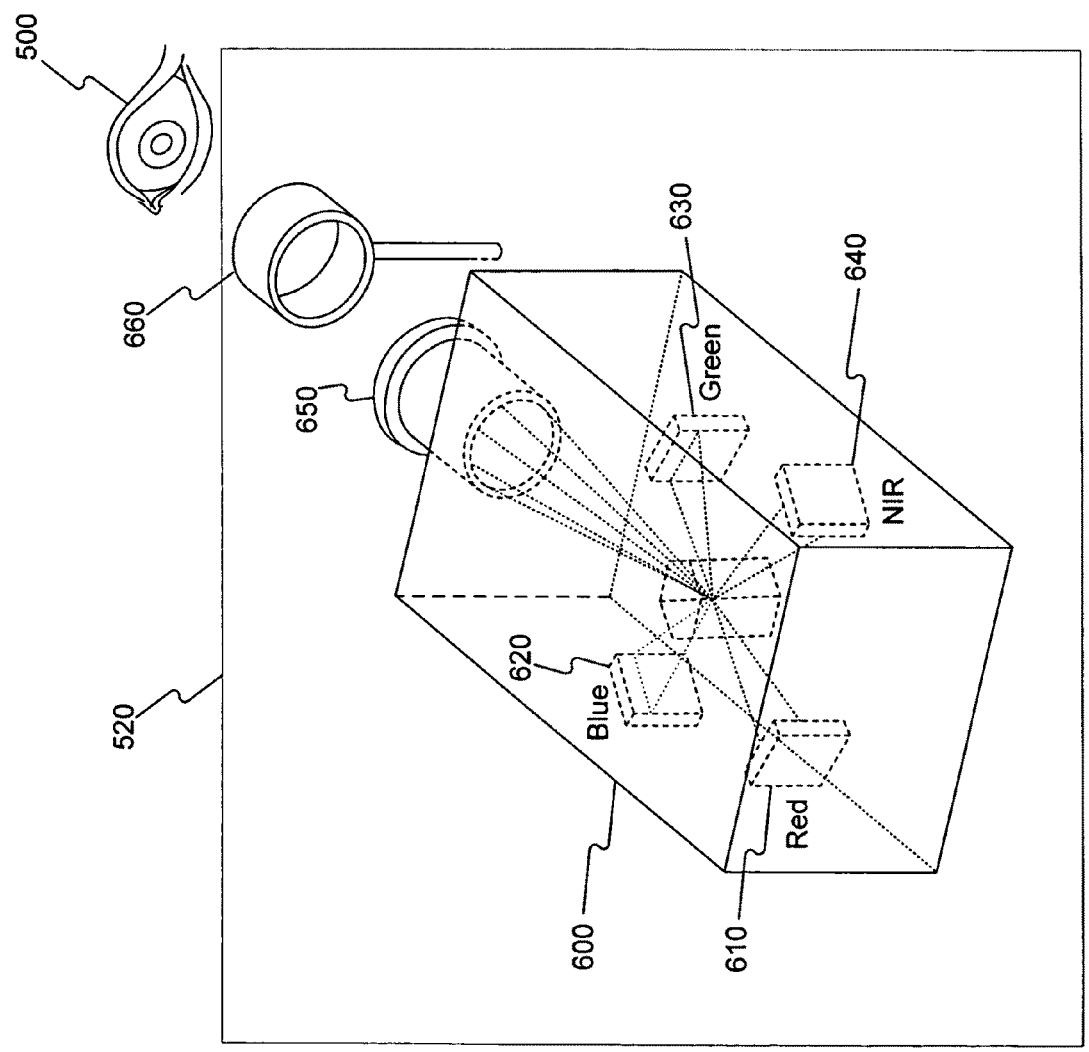
FIG. 6 shows a multispectral imaging device for acquiring iris images, consistent with an embodiment of the present invention.

FIG. 6 shows a multispectral imaging device for acquiring iris images, consistent with an embodiment of the present invention. Because multispectral iris images may be spatially registered with one another at the sensor level, multispectral imaging device 520 may observe and/or predict the effect of wavelength on the imaging of iris structure. More specifically, the reflectance properties of melanin can determine the color of the iris, so biometric enrollment and recognition devices like HIIDE™ collect iris images using NIR illumination. While NIR images make iris matching easier, especially for dark eyes, it is difficult to directly match NIR images, or the IrisCodes derived from them, to iris images which have been extracted from images or videos collected in the visible spectrum. Multispectral imaging device 520 enables the simultaneous collection of visible light images and NIR iris images, which may be registered at the pixel level. Multispectral imaging device 520 may simultaneously capture light from multiple frequencies, for example, from 400-1000 nm, encompassing both the visible and NIR portions of the photonic spectrum. By imaging the iris across a wide range of frequencies, the variations across iris color in melanin-induced iris texture may be used. In comparison to COTS iris imaging devices, multispectral imaging device 520 may provide a four-fold increase in information per pixel, enabling the utilization of pixel-level fusion and enhancement techniques to increase capture (i.e., enrollment) and recognition of images of lesser quality.

As shown in FIG. 6, multispectral imaging device 520 includes multispectral camera 600. In certain embodiments, multispectral camera 600 is a 4CCD (charge coupled device) single-lens camera, with a wide angle lens 650. Multispectral camera 600 simultaneously captures four images across four different wavelengths: red 610, blue 620, green 630, and NIR 640. In one embodiment, two Sony ICX205AL sensors (spectral response ranges between 400 nm and 1000 nm with a peak of 550 nm) may be used to capture the red channel 610 and NIR channel 640, and two Sony RGBICX205 sensors may be used to capture the blue channel 620 (e.g., blue response ranging from 400 nm to 550 nm with a peak at 460 nm) and green channel 630 (e.g., green response from 400 nm to 650 nm with a peak at 550 nm). Illuminating the iris using a broadband (e.g., 350 nm to 1700 nm) LED ring-light 660 located between multispectral camera 600 and subject 500 provides transmittance across all frequencies of interest.

Simultaneous acquisition by a single-lens 4CCD system allows all four channels to be spatially registered, i.e., aligned to enable quantitative analysis. Utilizing separate CCDs for each wavelength, instead of Bayer filters creates channels that may contain less noise. One skilled in the art will recognize that the internal optics of multispectral camera 600 are simplified for illustrative purposes.

Figure 7:
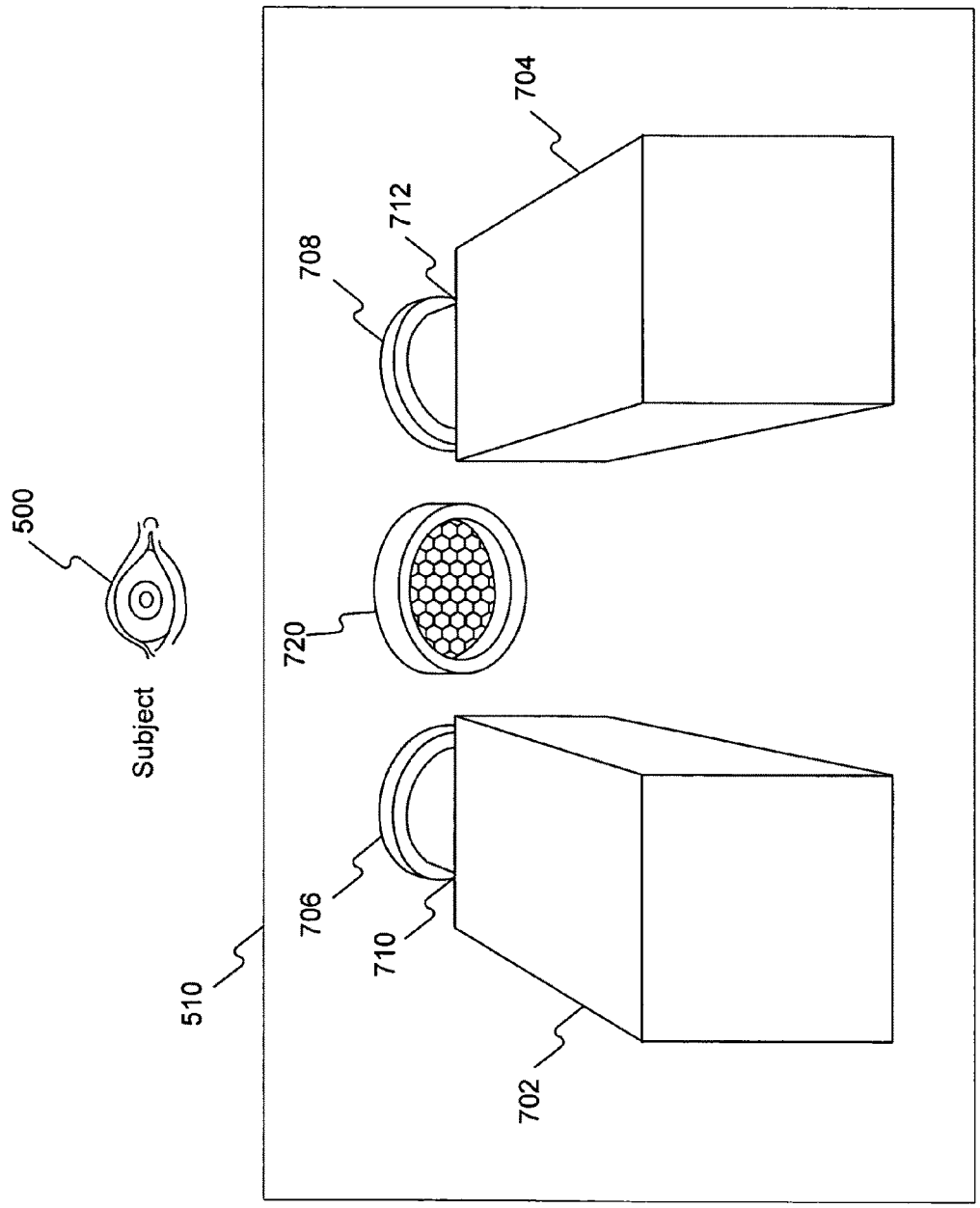
FIG. 7 shows a diagram of a device for acquiring iris images, consistent with an embodiment of the present invention.

FIG. 7 shows a diagram of a device for acquiring iris images, consistent with an embodiment of the present invention. Stereo rig 510 applies camera geometry to simultaneously acquire iris pairs such as (NIR, NIR), (NIR, Visible), and (Visible, Visible) with slightly different spatial orientations. Stereo rig 510 may collect iris data from subject 500 in a less restrictive manner than COTS iris recognition devices. For COTS iris recognition devices, to ensure that an iris is successfully localized, segmented, and encoded, a high quality image is required. Thus, a subject must be cooperative and imaging conditions must be optimal. By utilizing additional data through imaging an iris with a stereo camera, it is easier to obtain an acceptable iris image. For example, the additional information provided by stereo imaging may be used to enhance the image, compensate for low-focus, adjust for motion-blur, etc. In this way, it may be easier to image less cooperative subjects, provide covert iris imaging, etc., without a decrease in recognition performance.

As shown in FIG. 7, stereo rig 510 may include cameras 702 and 704, each equipped with a visible-cut filter (visible-cut filters 706 and 708). In one embodiment, cameras 702 and 704 may be Hitachi KP-F120 cameras, with sensitivity across the 400-1000 nm band. Because cameras 702 and 704 may image in both the NIR and visible spectrum, different filters may be used to adjust the impact of different NIR and visible light configurations on image quality. In certain embodiments, a cluster of NIR (750-950 nm) LED illuminators 720 may be centered between cameras 702 and 704 to limit iris specularities to a small portion of the pupil. Further, adaptive illumination, which varies in intensity based on ambient conditions, may be used to limit iris specularities to a small portion of the pupil. In certain embodiments, stereo rig 510 may be used to create a 3-D depth map of an iris using parameters such as intrinsic parameters (e.g., image point from camera 702 or 704 to pixel coordinates) and/or extrinsic parameters of stereo rig 510 (e.g., relative position and orientation of cameras 702 and 704). These and other parameters may be used to create a 3-D depth map of the iris of subject 500.

III. NIR-Equivalent Creation

Figure 8:
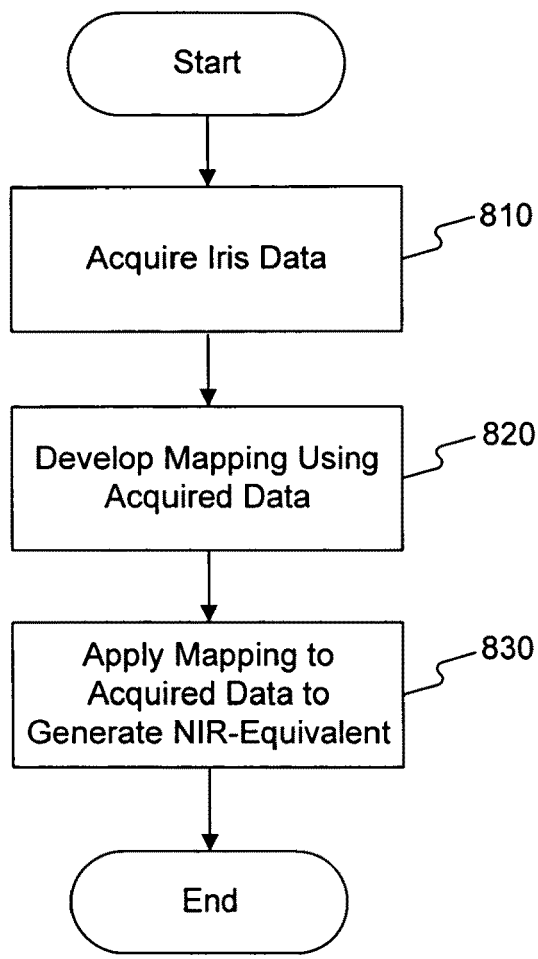
FIG. 8 shows an exemplary process for generating NIR-equivalent images, consistent with an embodiment of the present invention.

FIG. 8 shows an exemplary process for generating NIR-equivalent images, consistent with an embodiment of the present invention. As shown in FIG. 8, iris data is acquired (step 810). Stereo rig 510 or multispectral imaging device 520 may be used to acquire iris data, as discussed above with respect to FIGS. 5-7. As an example, a diverse and robust set of multispectral and stereo NIR iris images may be assembled from a set of unique subjects using a single-lens multispectral iris acquisition device, such as multispectral imaging device 520. The acquired iris images may include a wide variety of iride images, with the variety based on overall iris color, color gradient within the iris, total iris texture energy and/or quality of iris image. In certain embodiments, the acquired images may suffer from motion blur, defocus blur, low iris bits, etc. This lower quality image data may be useful in developing transforms, for example. Data may be acquired in parallel using both stereo rig 510 and multispectral imaging device 520. A large dataset with a distribution of eye color may be collected.

As discussed in more detail below with respect to FIGS. 9-12, a mapping is developed using the acquired iris data (step 820). The mapping may be applied to the acquired data to create an NIR-equivalent image (step 830), as discussed in more detail below with respect to FIGS. 9-13.

Figure 9:
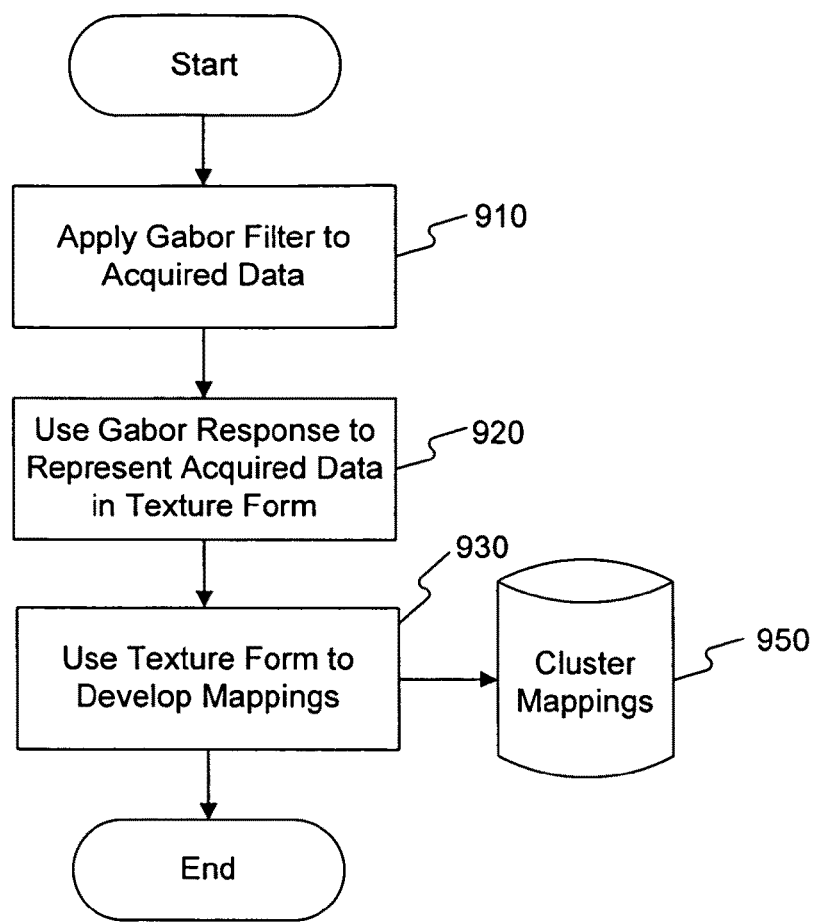
FIG. 9 shows an exemplary process for developing cluster mappings, consistent with an embodiment of the present invention.

FIG. 9 shows an exemplary process for developing cluster mappings, consistent with an embodiment of the present invention. As shown in FIG. 9, the acquired image data may be processed, e.g., using a Gabor filter (step 910). A multi-resolution complex Gabor response may be used to represent the acquired data in texture form (step 920). Texture-based encoding of the rich, unique structure of the iris may be used to create a quantifiable template of the iris that can be quickly and accurately matched against large datasets. Prior to recognition, the iris may be localized from the overall image of an eye or face. Localization may be done by finding landmark features of the iris (e.g., the limbic boundary and the pupil) and removing background features (e.g., eyelids, eye lashes, sclera).

Figure 10:
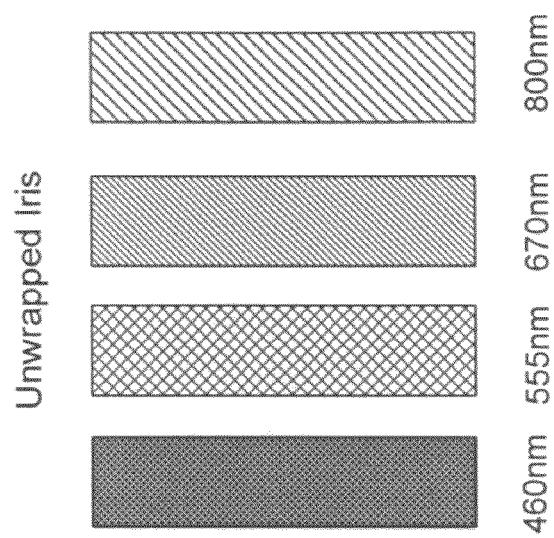
FIG. 10 shows a display of iris data at four wavelengths, consistent with an embodiment of the present invention.

Once the iris is localized, it is "unwrapped" using a polar transformation from its natural circular form into a fixed-size Cartesian rectangle, such as the one illustrated in FIG. 10. FIG. 10 shows a display of iris data at four wavelengths, consistent with an embodiment of the present invention. As shown in FIG. 10, additional texture detail may be visible in the lower bandwidths (e.g., 460 nm, 555 nm) of an unwrapped iris image than in the higher bandwidths (e.g., 670 nm, 800 nm). This is because the amount and distribution of melanin may impact the transmission, absorbency and reflectance of the iris image. Once in the unwrapped form, the textural content of the iris may be quantified, e.g., using 2D Gabor wavelet filters to create an IrisCode. Phasors, which contain information on the orientation, spatial frequency, and/or position of texture within the image are used to create the IrisCode. Because an IrisCode can be represented as fixed-size array of bits, efficient large-scale matching can be accomplished by measuring the Hamming distance (i.e., number of differing bits) between two IrisCodes. The Hamming distance is a measure of the independence of two IrisCodes, and if the irides are sufficiently statistically independent, they are deemed to be from two different subjects. Gabor-based iris encoding in certain embodiments may quantify and encode only the phase structure of the iris and discard the amplitude. Although certain metrics described below to assess mappings quality are based on amplitude, metrics used in creating mappings may be selected based on their ability to enhance poor phase structure regardless of signal amplitude.

Referring back to FIG. 9, the texture form is used to develop mappings (step 903) that can be used to associate color pictures with their corresponding NIR values, as discussed in more detail below with respect to FIG. 11. Because color varies between the anterior and posterior layers of the iris, generating a single mapping, or even a small collection of mappings for each overall "eye color" is not sufficient. Instead, cluster analysis (e.g., in the L*a*b* color space) may be used to identify representative color clusters based on the small patches of color that make up overall eye color (e.g., hazel eyes are a combination of many color patches). The mappings may be stored in cluster mappings database 950 for later use.

Figure 11:
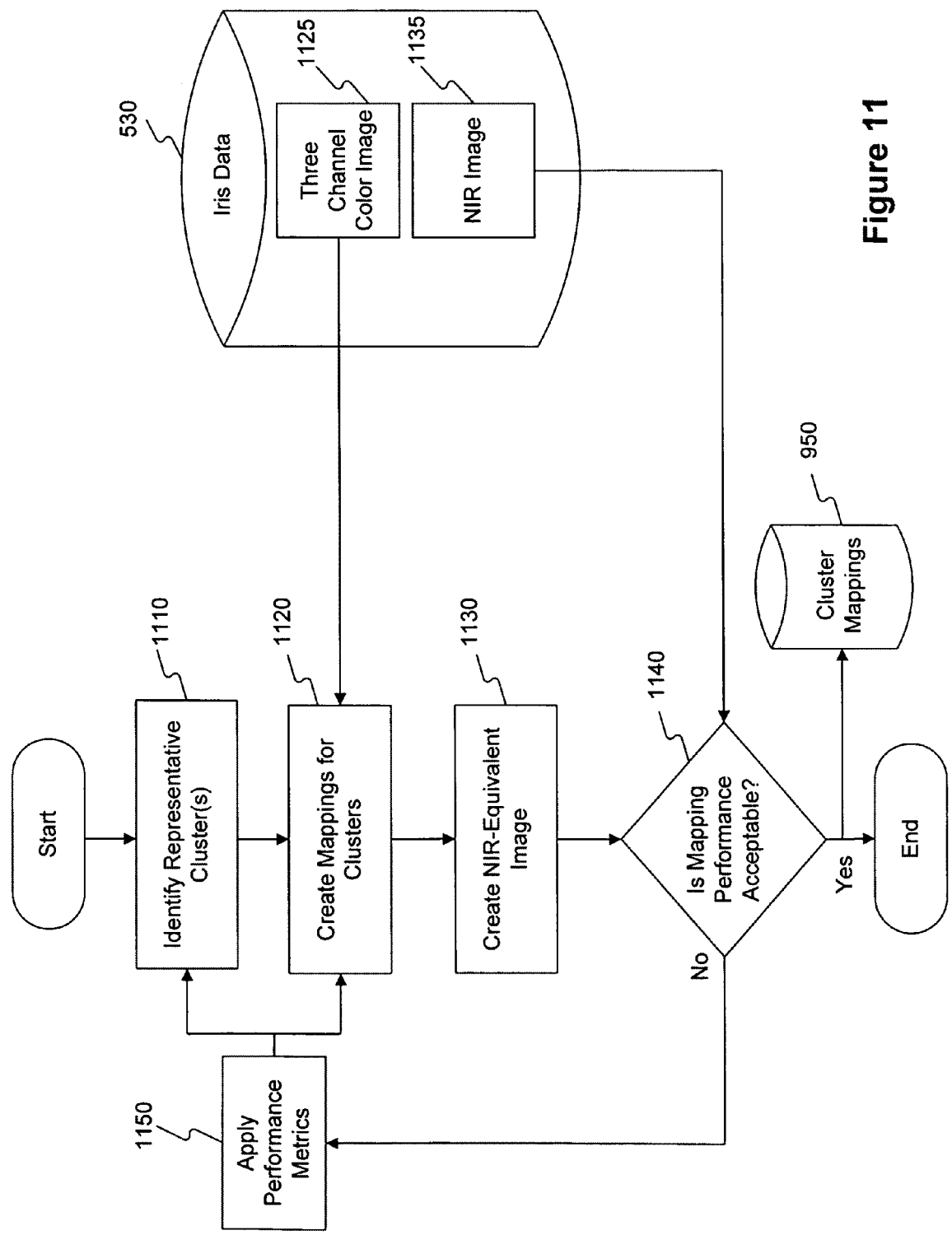
FIG. 11 shows an exemplary process for creating cluster mappings, consistent with an embodiment of the present invention.

FIG. 11 shows an exemplary process for creating cluster mappings, consistent with an embodiment of the present invention. As discussed above with respect to FIG. 5, iris data database 530 may store acquired iris images (e.g., visible light images, NIR images, etc.). As shown in FIG. 11, iris data database 530 may contain an image of the same iris in different formats, such as a three channel color image 1125 and a corresponding NIR image 1135. Three channel color image 1125 and NIR image 1135 may have been captured using multispectral imaging device 520, stereo rig 510, etc. In one embodiment, a four channel color image (not shown) may be stored in iris data database 530 and transformed (e.g., using a color space transform) into a format suitable for use in step 1120 (e.g., transformed into three-channel color image 1125).

As shown in FIG. 11, once the iris image is represented in texture form (e.g., as described with respect to FIG. 10), representative clusters may be identified (step 1110). This identification may be performed based on the small patches of color that make up overall eye color. An example of representative clusters for a "blue" iris is illustrated in more detail in FIG. 12.

Figure 12:
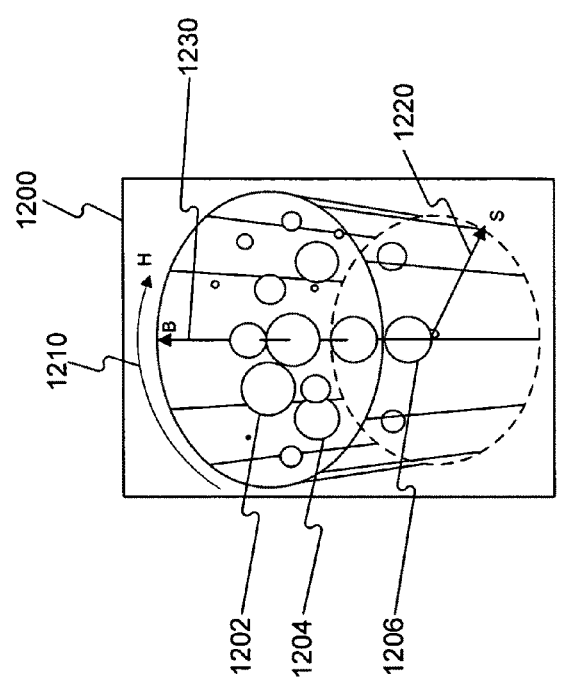
FIG. 12 shows a diagram of color patch clusters from an iris image, consistent with an embodiment of the present invention.

FIG. 12 shows a diagram of color patch clusters from an iris image, consistent with an embodiment of the present invention. As shown in FIG. 12, various clusters, e.g., cluster 1202, cluster 1204, and cluster 1206, are represented in a texture model 1200. Model 1200 shows that eye color does not vary smoothly across the iris, but instead is arranged in clusters of similar colors (e.g., color patches or clusters) which can have abrupt boundaries that arise from physiological structures within the anterior and posterior layers of the iris. In the embodiment depicted in FIG. 12, k-means clustering (k=32) in the L*a*b* color space may be used to determine the distribution of colors in a "blue" iris. Cluster 1202, for example, may represent a blue color patch. Cluster 1204 may represent a green color patch. Cluster 1206 may represent a dark brown color patch. Clusters, such as clusters 1202, 1204, and 1206, are distributed in model 1200 according to a color space accounting for the distribution of hue (H) 1210, space (S) 1220, and brightness (B) 1230. Cluster 1202 may be larger than clusters 1204 and 1206, indicating that more patches with cluster 1202's patch of iris color "blue" were found in the acquired iris image. (H), (S), and (B) describe colors as points in a cylinder whose central axis ranges from black at the bottom to white at the top with neutral colors between them, where the angle around the axis corresponds to "hue" (H), the distance from the axis corresponds to "saturation" (S), and the distance along the axis corresponds to "lightness", "value", or "brightness" (B).

Referring again to FIG. 11, cluster mappings are created for each cluster (step 1120). To create the cluster mappings, three-channel image 1125 may be used. Cluster mappings associate each of the representative color patches in three-channel image 1125 with their corresponding NIR values. Cluster mappings may be used to transform a small range of iris colors into its best "equivalent" NIR signal.

In one embodiment, a multistage supervised learning process is used to develop a set of mathematical models for approximating NIR iris images from visible light iris images. In the first stage of the learning process, the cluster analysis in the L*a*b* color space on the visible light channels of the multispectral iris images is used to identify a set of n representative color clusters such as clusters 1202, 1204, and 1206. Next, for each of the n clusters, a set of tuples (L*, a*, b*, NIR) is constructed that associates the L*a*b* and NIR values of the registered images. These tuples are then augmented with local structural information derived from k multiscalar log-Gabor filters $G(w)$, where w is the filter's center frequency, $(G(w_1), G(w_2), \ldots, G(w_k) L^*, a^*, b^*, NIR)$ such that, for each of the n clusters, a mathematical model, $f(G(w_1), G(w_2), \ldots, G(w_k), L^*, a^*, b^*, NIR) \approx NIR$ can be constructed using supervised learning to approximate the final NIR term given the first k+3 terms.

Each of the n learned mappings may be used for approximating an NIR iris image using features derived from the color and structure of a visible light iris image. Using the mappings for the clusters, an NIR-equivalent image is created (step 1130). To determine if a mapping performance is acceptable (step 1140), the generated NIR-equivalent image may be compared to corresponding NIR image 1135 stored in iris data database 530. If the performance is acceptable (step 1140, yes), for example if the generated NIR-equivalent image and NIR image 1135 are deemed to match sufficiently, the mapping is stored in cluster mappings database 950. If the performance is not acceptable (step 1140, no), for example because the generated NIR-equivalent image does not sufficiently match NIR image 1135, performance metrics may be applied (step 1150) to refine the identification of representative clusters (step 1110) and/or the creation of mappings (step 1120). These performance metrics may be, for example, high level assessments of the identification of clusters and the creation of mappings.

Figure 13:
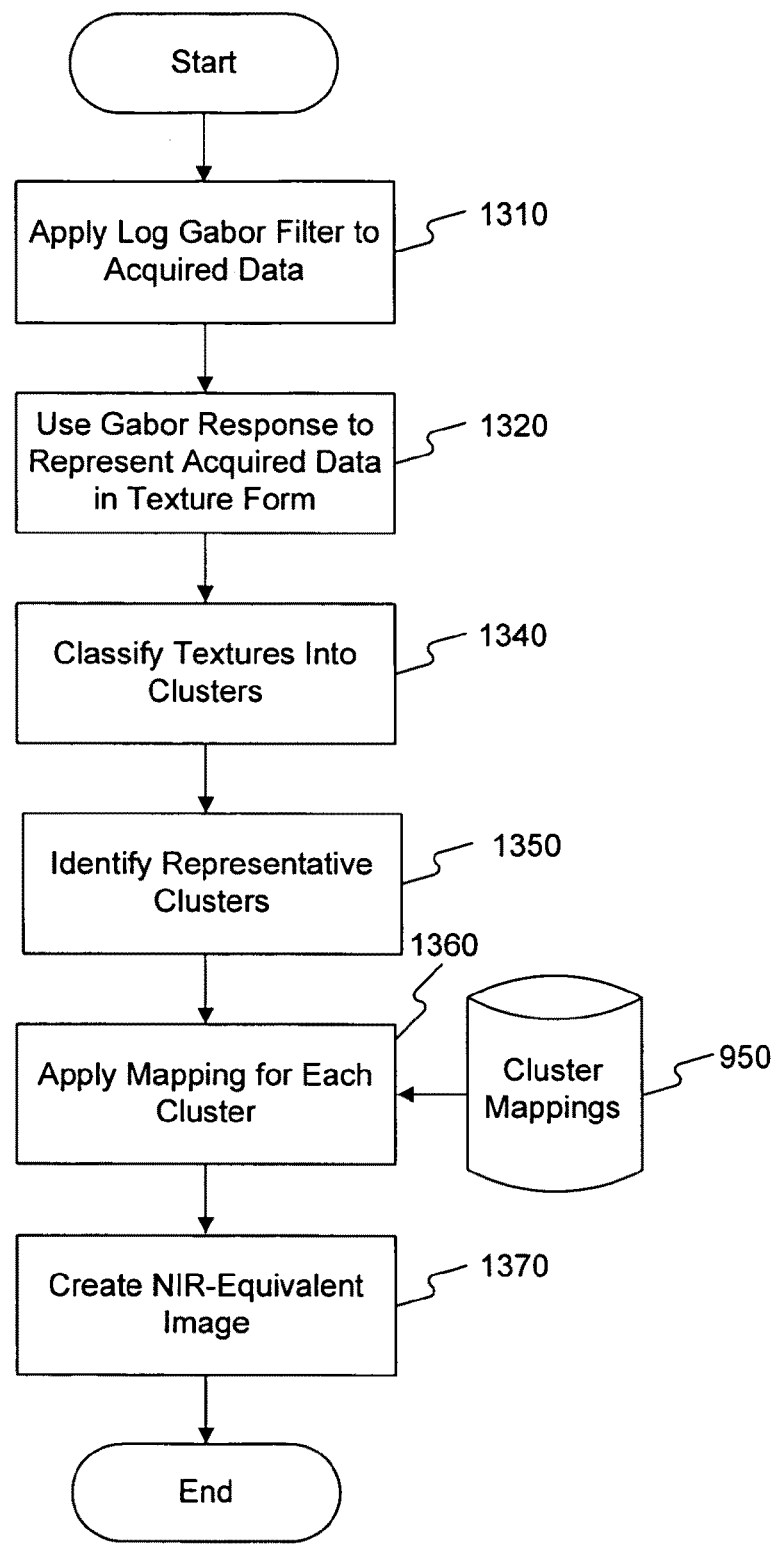
FIG. 13 shows an exemplary process for creating NIR-equivalent images, consistent with an embodiment of the present invention.

Once cluster mappings 950 have been developed, they may be applied to generate NIR-equivalent images for newly acquired data or for existing visible light images, for example. FIG. 13 shows an exemplary process for creating NIR-equivalent images, consistent with an embodiment of the present invention. As shown in FIG. 13, a log Gabor filter is applied to newly-acquired data (step 1310), and the Gabor response is used to represent the acquired data in texture form (step 1320), as described above with respect to FIG. 10. The textures are classified into clusters (step 1330), as described above with respect to FIG. 11, and representative clusters of the acquired iris image are identified (step 1340). The previously-developed cluster mappings 950 may be applied to each cluster (step 1350) to create an NIR-equivalent image for the newly-acquired data (step 1360). The NIR-equivalent image may be used in the example described above with respect to FIG. 4 (i.e., to match against existing NIR data).

IV. Multispectral Enhanced Iris Imaging

Traditionally, iris recognition systems use only a narrow band of the Near-Infrared (NIR) spectrum (i.e., 700-900 nm). Matching performance may depend on iris color, however, and may be improved by imaging outside of the NIR.

In certain embodiments of the present invention, fusion algorithms may be developed specifically for multispectral iris recognition. Pixel and/or feature level fusion may increase matching accuracy and capture (i.e., enrollment) rates compared to COTS NIR iris recognition systems, enhance matching accuracy, decrease industry-wide failure to enroll rates, which are estimated at a five to ten percent, etc.

Figure 14:
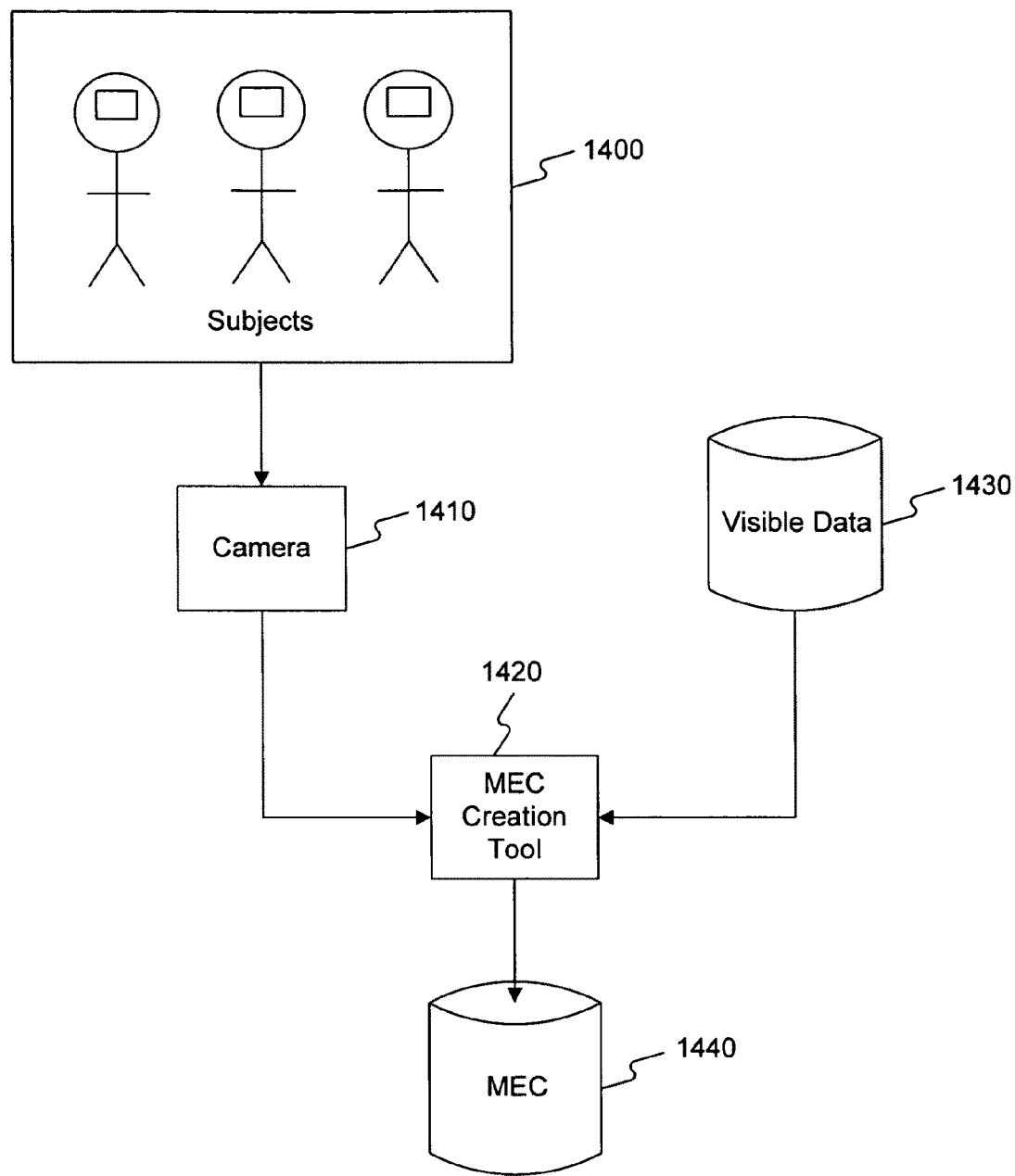
FIG. 14 shows a diagram of a system for creating optimal iris images, consistent with an embodiment of the present invention.

FIG. 14 shows a diagram of a system for creating optimal iris images, consistent with an embodiment of the present invention. Referring to FIG. 14 as an example, a company may create an iris image database of its employees by collecting images from its employees, subjects 1400, using camera 1410. Camera 1410 may be, e.g., multispectral imaging device 520 or stereo rig 510. Alternatively or additionally, previously collected visible data 1430 may be used (e.g., employee identification photos). The visible images collected by camera 1410, or visible data 1430, may be input into a Multispectral Enhanced Iris Code (MEC) creation tool 1420. MEC creation tool 1420 may generate iris codes corresponding to the visible data images that can be used for iris matchings. For example, MEC creation tool 1420 may analyze the reflectance of an iris image at each band of the image, and select the areas of the iris image that have the highest probability of resulting in an accurate match. By doing so, MEC creation tool may create a single high confidence image—a Multispectral Enhanced Iris Code (MEC), which is discussed in more detail below with respect to FIGS. 15-16. The MECs may be stored in MEC database 1440 for later use. The MECs may improve the performance of commercial iris matchers, and may also reduce failure to enroll rates.

Figure 15:
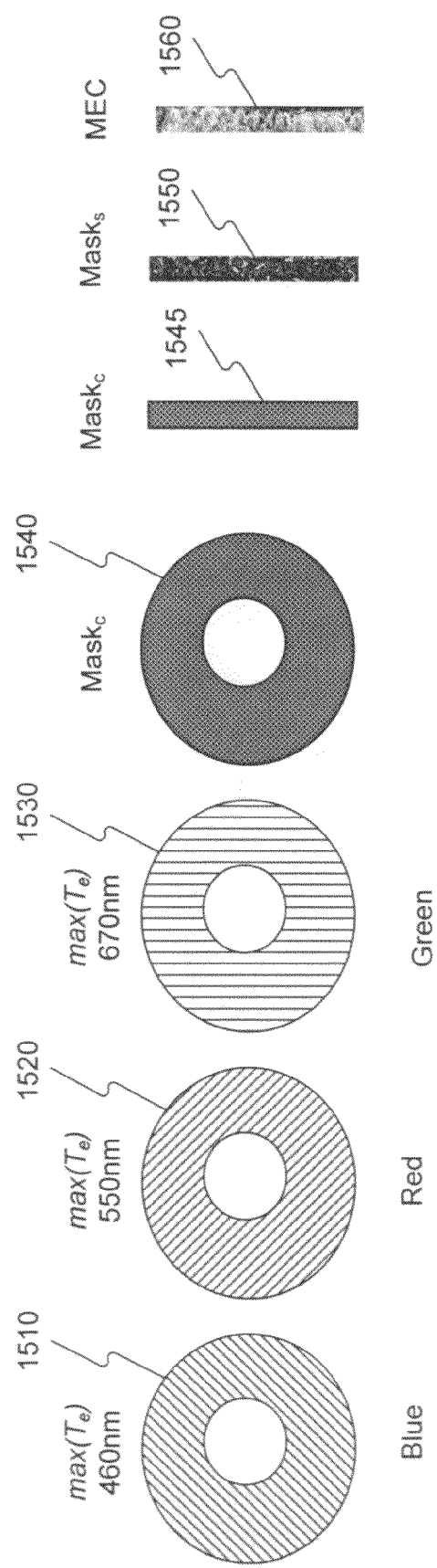
FIG. 15 shows a display of a multispectral enhanced iris code, consistent with an embodiment of the present invention.

FIG. 15 shows a display of a multispectral enhanced iris code (MEC), consistent with an embodiment of the present invention. As shown in FIG. 15, MEC masks and an MEC image are generated using three multispectral iris images: blue image 1510 (460 nm), red image 1520 (550 nm), and green image 1530 (670 nm). The iris images 1510, 1520, and 1530 show the original and unwrapped distribution within each wavelength of the image patches exhibiting the highest texture responses across all of the imaged wavelengths. The max ($T_e$) represents that each image 1510, 1520, and 1530 is captured at the highest value of the texture measure entropy in each wavelength illustrated.

For each wavelength w, a Mask$_w$ is set if and only if the value of the texture measure $T_e$, across all imaged wavelengths, is highest at that location in wavelength w. Mask$_c$ 1540 is depicted in IrisCode form as Mask$_c$ 1545. Mask$_c$ 1540 is a channel mask. Mask$_s$ 1550 is a structural mask. MEC 1560 is generated by applying Mask$_c$ 1545 and Mask$_s$ 1550 fusing the regions with the highest information (i.e., maximum texture) from each wavelength to create a single enhanced image. An 800 nm (NIR) image is not shown in this example, as a very light blue iris was used to illustrate the point that stronger texture is available outside of the NIR band, and for this particular iris, the texture elicited under visible light was more pronounced at every point than under NIR.

More formally, let $I_w$ be an iris imaged at wavelength w and $T(I_w(x,y))$ be a monotonically increasing measure of the texture at a given position ($I_w(x,y)$) in the image $I_w$, then MEC 1560 is defined as an image where, $$I_{mec}(x,y) = \arg\max(T(I_w(x,y)))$$

and the mask $M_w$ as, $$M_w(x,y) = \begin{cases} 1 & \Leftrightarrow \arg\max(T(I_w(x,y))) \\ 0 & otw. \end{cases}$$

Figure 16:
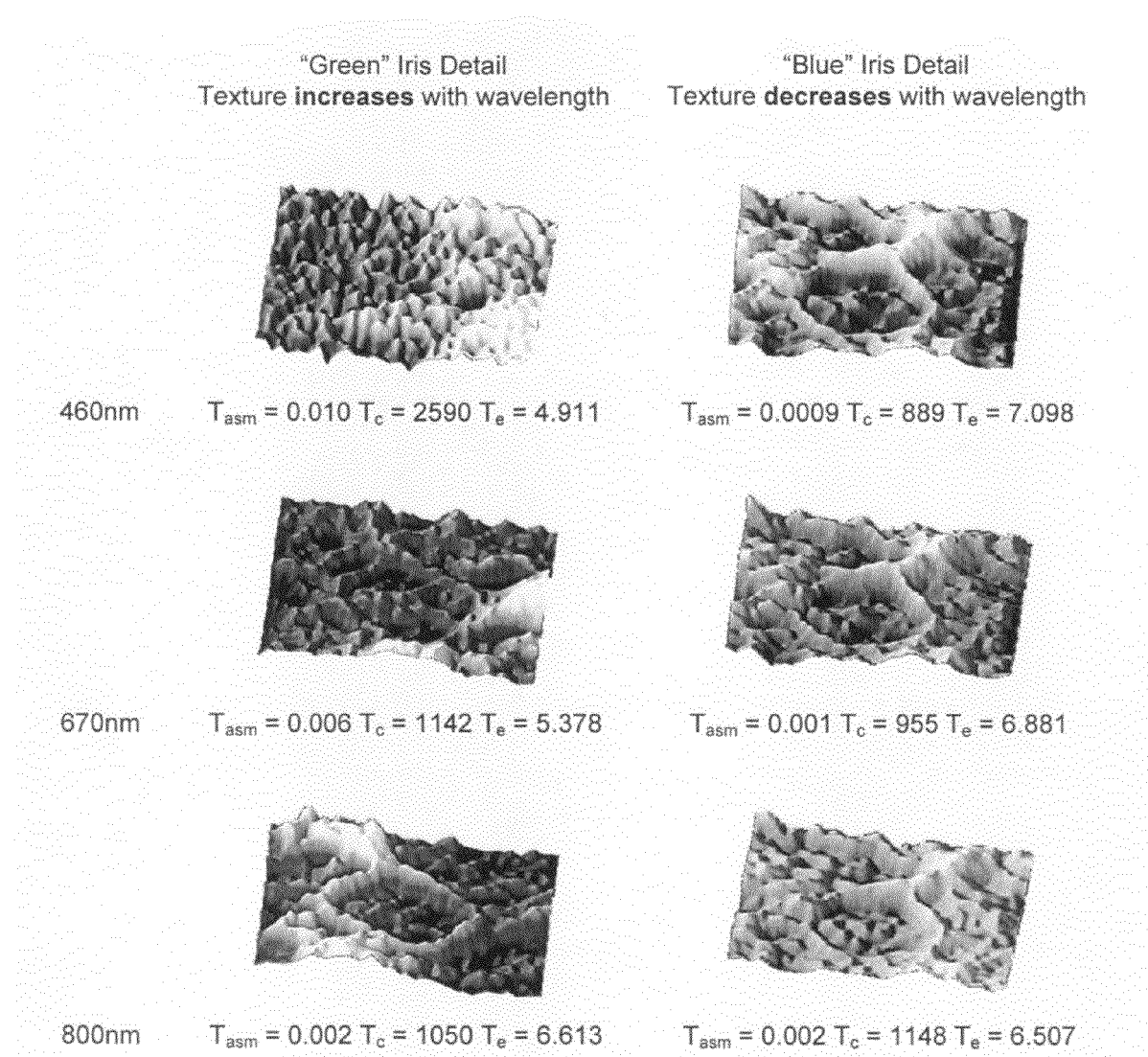
FIG. 16 shows a display of iris detail illustrating texture correlation across wavelengths, consistent with an embodiment of the present invention.

Fusing multispectral images at the pixel-level using image enhancement techniques, such as super resolution and stereoscopy, may enhance the landmarks of the eye (e.g., limbic boundary, pupil, eyelashes) enabling improvements in localization and/or segmentation of the iris. The amount of texture information that can be extracted from a given iris color patch depends on the wavelength under which it is illuminated. In light colored patches, more information may be available at shorter wavelengths than at longer wavelengths. Conversely, for darker colored patches, more information may be available at longer wavelengths than at shorter wavelengths. FIG. 16 shows a display of iris detail illustrating texture correlation across wavelengths, consistent with an embodiment of the present invention.

FIG. 16 shows details from "Green" (left) and "Blue" (right) irides from iris images acquired at three different wavelengths: 460 nm, 670 nm, and 800 nm. The irides are shown as heat-coded height maps where hotter colors (e.g., white, yellow, and red) indicate higher values and cooler colors (e.g., purple, blue, and black) indicate lower values. In the darker "Green" iris (left), the texture increases with wavelength. As an analogy, the iris may be compared to Braille code for a blind person. Generally, increased texture in Braille code makes the Braille code more "readable." Similarly, for the "Green" iris (left), the increased texture makes the iris more "readable" (i.e., the iris is easier to identify, and/or the information is more readily extractable.) The crypt is clearly visible under 800 nm (NIR) but by 460 nm has deteriorated to noise.

The opposite occurs in the lighter "Blue" iris where the crypt is clearly visible under 460 nm (Blue) but by 800 nm is much less visible. Across the portion of the spectrum under consideration, the texture of lighter colored patches of the iris may increase with the frequency of the illumination, and decrease in a similar way for darker patches. This correlation is demonstrated using the following texture measures derived from the gray-level co-occurrence matrix, where $P_{\theta,d}(a,b)$ describes how frequently two pixels with gray-levels a,b appear in a window separated by distance d in direction $\theta$:

$$T_{asm} = \Sigma_{a,b} P_{\theta,d}^2(a,b)$$

angular second moment, $$T_c = \Sigma_{a,b} |a-b|^2 P_{\theta,d}^1(a,b),$$

contrast, and $$T_e = \Sigma_{a,b} P_{\theta,d}(a,b) \log_2 P_{\theta,d}(a,b)$$

entropy. The texture measures $T_{asm}$ and $T_c$ decrease with the information content of the image while $T_e$ increases with the information content of the image. These texture measures may be combined with other texture measures derived from multiscale log-Gabor filter banks to create the texture function $T(I_w(x,y))$ defined above.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for generating iris images, comprising:
an iris image acquisition device adapted to acquire a visible light image of an iris;
a database adapted to store the acquired visible light iris image and transformation mappings;
a texture model section adapted to model the acquired visible light image in a texture model that clusters features from the acquired visible light image;
a mapping section adapted to select a transformation mapping from the database for each of the clusters;
an image transformation section adapted to apply the selected mappings to the acquired visible light image to generate a Near-Infrared equivalent representation of the iris; and
an image output section adapted to output the Near-Infrared equivalent representation of the iris.

2. The system of claim 1, further including:
an iris matching section adapted to compare the Near-Infrared equivalent with a Near-Infrared iris code.

3. The system of claim 1, further including:
a biometric identification section adapted to identify an image of a person based on the Near-Infrared equivalent.

4. The system of claim 1, wherein the iris image acquisition device is a multispectral imaging device adapted to acquire spatially registered iris images simultaneously in four wavelengths.

5. The system of claim 1, wherein the iris image acquisition device includes two stereo cameras adapted to acquire the visible light image and a corresponding Near-Infrared image of the iris.

6. The system of claim 5, further comprising:
a depth map section adapted to generate a three-dimensional depth map of the acquired visible light image using a relative position of the two stereo cameras and an orientation of the two stereo cameras.

7. A method for generating iris images comprising:
acquiring a visible light image of an iris;
storing the acquired visible light iris image and transformation mappings in a database;
modeling the acquired visible light image by clustering textures from the acquired visible light image;
selecting mappings from the database for each of the clusters;
applying the selected mappings to the acquired visible light image to generate a Near-Infrared equivalent representation of the iris; and
matching the Near-Infrared equivalent with a Near-Infrared image of the iris.

8. The method of claim 7, wherein the modeling further comprises clustering textures by applying k-means clustering.

9. The method of claim 7, further including:
identifying an image of a person based on the matching.

10. The method of claim 7, wherein the visible light image is retrieved from a database of previously-stored visible light images.

11. The method of claim 7, wherein the visible light image is acquired by a multispectral imaging device.

12. The method of claim 7, wherein the visible light image is acquired by two stereo cameras.

13. The method of claim 12, further comprising:
generating a three-dimensional depth map of the acquired visible light image based on a relative position of the two stereo cameras and an orientation of the two stereo cameras.

* * * * *